Aug. 30, 1927.
G. WALTHER
1,641,107
PRODUCING OF CAST METAL WHEELS
Original Filed May 10, 1920
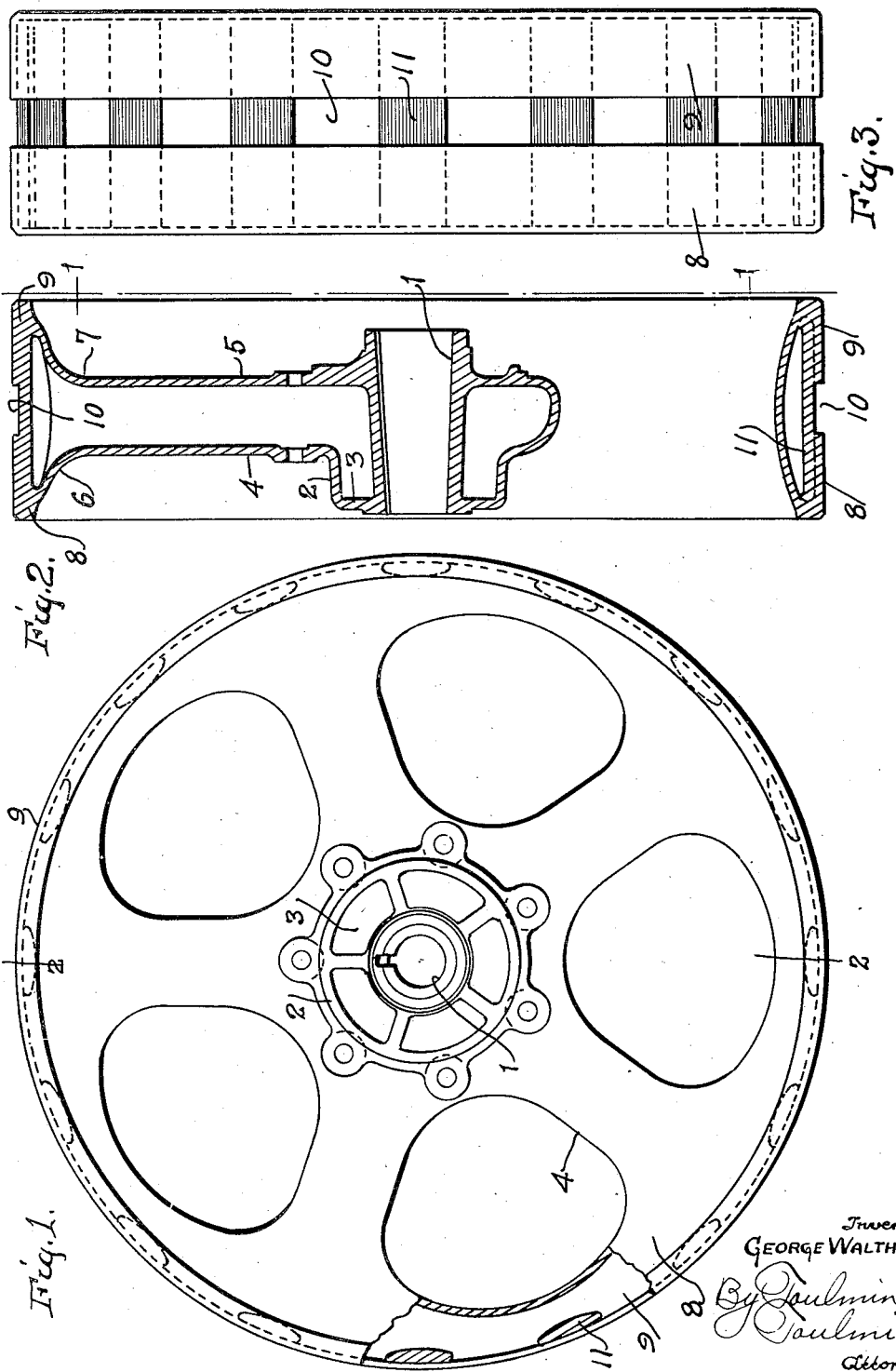
Inventor
GEORGE WALTHER, Patented Aug. 30, 1927.

1,641,107

UNITED STATES PATENT OFFICE.

GEORGE WALTHER, OF DAYTON, OHIO, ASSIGNOR TO THE DAYTON STEEL FOUNDRY COMPANY, OF DAYTON, OHIO, A CORPORATION OF OHIO.

PRODUCING OF CAST METAL WHEELS.

Application filed May 10, 1920, Serial No. 380,217. Renewed July 3, 1924.

My invention relates to cast metal wheels.

The object of my invention is to produce a cast metal wheel of a type whose construction shall remain unchanged in the essential particulars when it is necessary to adapt the construction to varying sizes of axles, bearings, etc.

At the present time, cast wheels, and in particular cast steel wheels for automotive equipment, are subject to the objection that radical modifications in the patterns must be made to fit each cast steel wheel to the particular type of axle and bearing with which the wheel is to be fitted according to the desire of the individual manufacturer of the automotive equipment. This seriously disturbs economical production in the foundry.

It is the object of my invention to provide a wheel of such construction which will reduce these difficulties to a minimum by preserving the spokes and rim and hub in the exterior dimensions in the same form, shape and dimensions for each type of axle. The only variation that will be made will be in the interior diameter of the hub without disturbing the exterior diameter.

In the accompanying drawings:

Fig. 1 is an elevation of a wheel embodying my invention looking at the same in the direction indicated by the arrows on the line 1—1 of Fig. 2.

Fig. 2 is a section taken on the line 2—2 of Fig. 1;

Fig. 3 is a plan view of the rim illustrating the bars for tying the rim members together.

In these drawings my improved wheel comprises a hollow hub having an inner tubular wall 1 which is adapted to receive bearings and an outer spoke supporting wall 2 connected to said inner wall by a wall 3 forming the outer end of the hub. The wall 2 is parallel to the axis of the hub and joins the wall 3 to the outer wall 4 of a spoke. The relation of the wall 2 with respect to the spokes remains constant, while the distance between the walls 1 and 2, and consequently the length of the wall 3, varies according to the internal diameter of the hub which depends upon the particular axle and bearing which is being used with this standard type of wheel. The spokes are hollow and comprise walls 4 and 5 substantially parallel for a portion of their length and curved outwardly and upwardly, as shown at 6 and 7. These outwardly and upwardly curved portions merge with the wheel rim which is hollow and comprised of two tread sections 8 and 9. These sections 8 and 9 terminate short of one another, leaving a gap 10, such gap being bridged at intervals throughout the periphery of the rim by tie bars 11. This separation of the rim treads permits easy truing up of the wheel. It will be noted that the tie bars 11 extend from points adjacent the outer edges of the rim so that they are overlapped by the portions 8 and 9 for a considerable distance, thus reinforcing the rim to withstand the strains and shocks to which the wheel is subjected.

From the foregoing description it will be seen that I have provided a wheel having a hub construction which may readily be changed to adapt it to different sizes of axles and bearings without changing the other dimensions of the wheel, and a rim having a divided tread reinforced to withstand the usual strains and shocks.

I desire to comprehend within my invention such variations as may be within its scope without limiting myself to the specific embodiment of it here illustrated.

Having thus fully described my invention, what I claim as new and desire to secure by Letters Patent is:

1. In a cast wheel, a hollow rim, hollow spokes and a hollow hub with an inner tubular wall and an outer spoke supporting wall, one wall of said hub being projected laterally of the inner ends of the spokes.

2. A cast metal wheel comprising a hub, hollow spokes and a rim, the hub having an inner tubular wall to receive bearings and an outer spoke-supporting wall extending beyond the spokes toward the outer end of the hub to form a substantially cylindrical wall and merged into the walls of the spokes, and a hub end wall joining said inner tubular wall and said outer spoke supporting wall.

3. A cast metal wheel comprising a hub, hollow spokes and a rim, the hub having an inner tubular wall to receive bearings and an outer spoke supporting wall extending beyond the spokes to support the bearing at the outer end of the hub.

4. A cast metal wheel comprising a hub, hollow spokes and a rim, the hub having an inner tubular wall extended beyond the spokes at the inner and outer ends of the hub to support a bearing, and an outer spoke supporting wall also extended beyond the spokes at the outer end of the hub and adapted to further support the bearing at said end.

In testimony whereof, I affix my signature.

GEORGE WALTHER.